US008088250B2

(12) United States Patent
Cheng et al.

(10) Patent No.: US 8,088,250 B2
(45) Date of Patent: Jan. 3, 2012

(54) METHOD OF INCREASING FILLER CONTENT IN PAPERMAKING

(75) Inventors: Weiguo Cheng, Naperville, IL (US); Jun Li, Huangshi (CN); Yulin Zhao, New District Suzhou (CN); Qing Long Rao, Jiangsu (CN)

(73) Assignee: Nalco Company, Naperville, IL (US)

( * ) Notice: Subject to any disclaimer, the term of this patent is extended or adjusted under 35 U.S.C. 154(b) by 396 days.

(21) Appl. No.: 12/323,976

(22) Filed: Nov. 26, 2008

(65) Prior Publication Data

US 2010/0126684 A1 May 27, 2010

(51) Int. Cl.
*D21H 11/00* (2006.01)
(52) U.S. Cl. ...................................................... 162/162
(58) Field of Classification Search .................. 162/162, 162/158, 164.6, 168.1, 181.1, 181.2, 181.4, 162/181.6, 181.8
See application file for complete search history.

(56) References Cited

U.S. PATENT DOCUMENTS

| 2,037,525 | A | 4/1936 | Marantz |
| 4,181,567 | A | 1/1980 | Riddell et al. |
| 4,605,702 | A | 8/1986 | Guerro et al. |
| 4,710,270 | A | 12/1987 | Sunden et al. |
| 5,221,435 | A | 6/1993 | Smith |
| 6,190,663 | B1 | 2/2001 | Hawkins et al. |
| 6,592,718 | B1 | 7/2003 | Shing et al. |
| 7,211,608 | B2 | 5/2007 | Niinikoski et al. |
| 2005/0161181 | A1 | 7/2005 | John |

FOREIGN PATENT DOCUMENTS

GB 2016498 9/1979

*Primary Examiner* — Mark Halpern
(74) *Attorney, Agent, or Firm* — Benjamin E. Carlsen; Michael B. Martin

(57) ABSTRACT

The invention provides a method of producing paper with a higher proportion of mineral filler particles than is otherwise be possible without the expected loss in paper strength. The method allows for the use of the greater amount of filler particles by coating at least some of the filler particles with a material that prevents the filler materials form adhering to a strength additive. The strength additive holds the cellulose fibers together tightly and is not wasted on the filler particles. The method is particularly effective when the filler particles are a PCC-GCC blend and when the GCC particles are coated with the adherence preventing coating.

18 Claims, 3 Drawing Sheets

METHOD OF INCREASING FILLER CONTENT IN PAPERMAKING

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to a method of increasing the strength of a paper mat of fibers produced in a papermaking process. Paper mat comprises water and solids and is commonly 4 to 8% water. The solid portion of the paper mat includes fibers (typically cellulose based fibers) and can also include filler. Increasing the strength of the paper mat would allow one to increase the proportion of the solids that is filler content. This is desirable because it reduces raw materials costs, reduces energy needed in the papermaking process, and increases the optical properties of the paper. Prior Art discloses paper mat having a solid portion of between 10% and 40% filler. The Prior Art however also discloses that increasing the filler content coincides with a loss in strength in the resulting paper.

Fillers are mineral particles that are added to paper mat during the papermaking process to enhance the resulting paper's opacity and light reflecting properties. Some examples of fillers are described in U.S. Pat. No. 7,211,608. Fillers include inorganic and organic particle or pigments used to increase the opacity or brightness, reduce the porosity, or reduce the cost of the paper or paperboard sheet. Some examples of fillers include one or more of: kaolin clay, talc, titanium dioxide, alumina trihydrate, barium sulfate, magnesium hydroxide, pigments such as calcium carbonate, and the like. Previous attempts to increase the filler content in paper without losing paper strength are described in British Patent GB 2016498, and U.S. Pat. Nos. 4,710,270, 4,181,567, 2,037,525, 7,211,608, and 6,190,663.

Calcium carbonate filler comes in two forms, GCC (ground calcium carbonate) and PCC (precipitated calcium carbonate). GCC is naturally occurring calcium carbonate rock and PCC is synthetically produced calcium carbonate. Because it has a greater specific surface area, PCC has greater light scattering abilities and provides better optical properties to the resulting paper. For the same reason however, PCC filled paper mat produces paper which is weaker than GCC filled paper.

Paper strength is a function of the number and the strength of the bonds formed between interweaved fibers of the paper mat. Filler particles with greater surface area are more likely to become engaged to those fibers and interfere with the number and strength of those bonds. Because of its greater surface area, PCC filler interferes with those bonds more than GCC.

As a result, papermakers are forced to make an undesirable tradeoff. They must either choose to select a paper with superior strength but inferior optical properties or they must select a paper with superior optical properties but inferior strength. Thus there is a clear need for a method of papermaking that facilitates a greater amount of filler in the paper, a paper that has a high opacity, and a filled paper that has a high degree of strength.

BRIEF SUMMARY OF THE INVENTION

At least one embodiment of the invention is directed towards a method of papermaking having an increased filler content that does not coincide with a loss in strength in the resulting paper. The method comprises the steps of: providing a blend of filler particles, at least one strength additive, and cellulose fiber stock; treating the filler particles with a composition of matter; combining the filler particles with the cellulose fiber stock; and forming a paper mat by removing some of the water from the combination. At least 10% of the filler particles are the precipitated form of calcium carbonate (PCC) and at least 10% of the filler particles are the ground form of calcium carbonate (GCC). The cellulose fiber stock comprises a plurality of cellulose fibers and water. The composition of matter inhibits the strength additive from adhering to the filler particles. In at least one embodiment, the cellulose fiber stock and the filler particles are combined to form a furnish and subsequently the filler particles are treated with the composition of matter.

At least one embodiment of the invention is directed towards a method in which the blend of filler particles further comprises one item selected from the list consisting of: calcium carbonate, organic pigment, inorganic pigment, clay, talc, titanium dioxide, alumina trihydrate, barium sulfate, magnesium hydroxide, and any combination thereof.

At least one embodiment of the invention is directed towards a method in which the composition of matter is an AcAm/DADMAC copolymer. At least one embodiment of the invention is directed towards a method in which the strength additive is glyoxylated Acrylamide/DADMAC copolymer. At least one embodiment of the invention is directed towards a method in which the strength additive and the composition of matter carry the same charge.

At least one embodiment of the invention is directed towards a method in which the calcium carbonate is in one form selected from the list consisting of: dry calcium carbonate, dispersed slurry calcium carbonate, chalk, and any combination thereof. At least a portion of the calcium carbonate can be in a dispersed slurry calcium carbonate form, the dispersed slurry calcium carbonate further comprising at least one item selected from: polyacrylic acid polymer dispersants, sodium polyphosphate dispersants, Kaolin clay slurry, and any combination thereof. The blend of filler particles can be 50% GCC and 50% PCC. The composition of matter can be a coagulant and can be selected from the list consisting of: inorganic coagulants, organic coagulants, condensation polymerization coagulants, and any combination thereof. The coagulant can have a molecular weight range of between 200 and 1,000,000.

At least one embodiment of the invention is directed towards a method in which the composition of matter is a coagulant selected from the list consisting of alum, sodium aluminate, polyaluminum chlorides, aluminum chlorohydroxide, aluminum hydroxide chloride, polyaluminum hydroxychloride, sulfated polyaluminum chlorides, polyaluminum silica sulfate, ferric sulfate, ferric chloride, epichlorohydrin-dimethylamine (EPI-DMA), EPI-DMA ammonia crosslinked polymers, polymers of ethylene dichloride and ammonia, condensation polymers of multifunctional diethylenetriamine, condensation polymers of multifunctional tetraethylenepentamine, condensation polymers of multifunctional hexamethylenediamine condensation polymers of multifunctional ethylenedichloride, melamine polymers, formaldehyde resin polymers, cationically charged vinyl addition polymers, and any combination thereof.

At least one embodiment of the invention is directed towards a method in which the ratio of strength additive relative to the solid portion of the paper mat can be 0.3 to 5 kg of additive per ton of paper mat. At least some of the GCC particles can be treated with the composition of matter. At least one embodiment of the invention is directed towards a method in which none of the PCC particles are treated with the composition of matter. The strength additive can be a cationic starch. The filler particles can have a mass which is up to 50% of the combined mass of the solid portion of the paper mat. The strength additive and the composition of matter can carry the same charge.

At least one embodiment of the invention is directed to a composition of matter for use in a papermaking process. The composition of matter comprises: cellulose, filler particles, a strength additive, and a coating surrounding at least some of the filler particles. The coating is constructed and arranged to prevent the strength additive from adhering to the filler particles. In at least one embodiment, at least some of the filler particles are calcium carbonate. In at least one embodiment, the filler particles are GCC, PCC, or a combination of the two. In at least one embodiment, the filler particles comprise at least 10% PCC and 10% GCC.

BRIEF DESCRIPTION OF THE DRAWINGS

A detailed description of the invention is hereafter described with specific reference being made to the drawings in which.

DETAILED DESCRIPTION OF THE INVENTION

Figure 1:
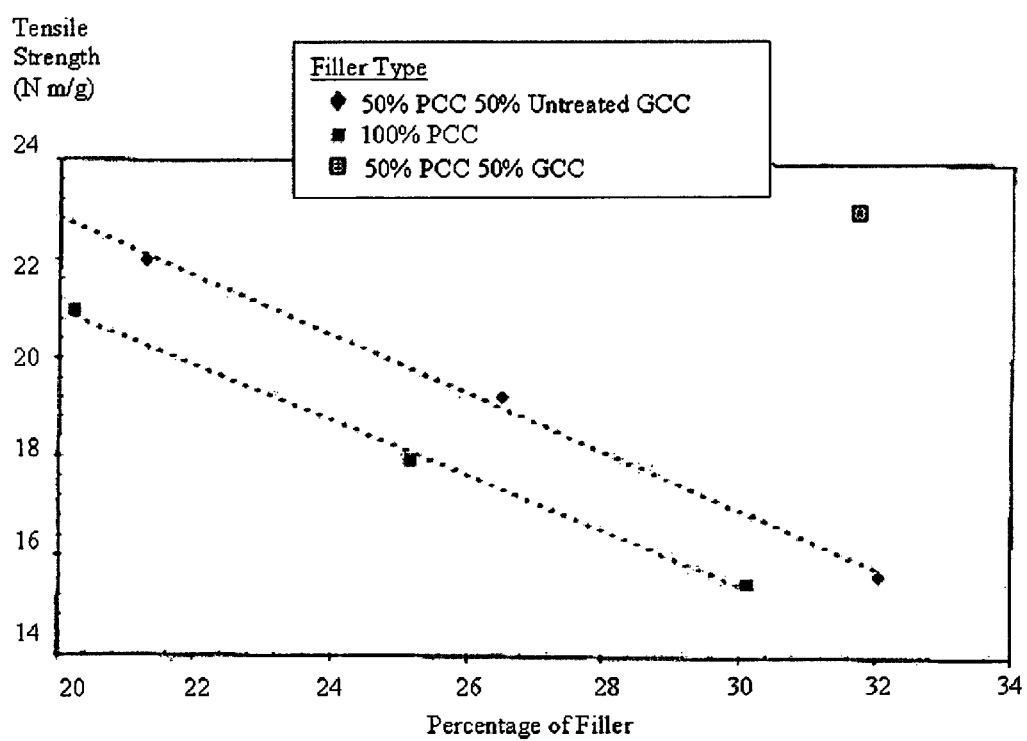
FIG. 1 is a graph showing the improved strength of paper made according to the invention.

In at least one embodiment of the invention is a method of making paper which is strong, has a high filler content, has a high PCC content, and has superior optical properties. In at least one embodiment of the invention the method of papermaking comprises the steps of: creating a filler blend of PCC and GCC in which PCC comprises at least 10% by mass of the filler and GCC comprises at least 10% of the filler mass, pre-treating at least some of the filler particles with a coating that decreases the adhesion between a strength additive and the filler particles, and adding both the filler blend and the strength additive to the paper mat.

It has been known for some time that adding strength additives to paper mat increases the strength of the resulting paper. Some examples of strength additives are described in U.S. Pat. No. 4,605,702. Some examples of strength additives are cationic starches, which adhere to the cellulose fibers and tightly bind them together.

Unfortunately it is not practical to add large amounts of strength additives to compensate for the weakness that results from using large amounts of filler in paper mat. One reason is because strength additives are expensive and using large amounts of additives would result in production costs that are commercially non-viable. In addition, adding too much strength additive negatively affects the process of papermaking and inhibits the operability of various forms of papermaking equipment. As an example, in the context of cationic starch strength additives, the cationic starch retards the drainage and dewatering process, which drastically slows down the papermaking process.

Furthermore cellulose fibers can only adsorb a limited amount of strength additive. This imposes a limit on how much additive and therefore how much filler can be used. One reason why this is so is because strength additive tend to neutralize the anionic fiber/filler charges and when these charges are too neutralized further adsorption of strength additives is inhibited.

Unfortunately, adding filler to the paper mat also reduces the effectiveness of the strength additive. The strength additive has a tendency to coat the filler particles. The more filler particles present, the more strength additive coats the filler particles, and therefore there is less strength additive available to bind the cellulose fibers together. Because there is a maximum amount of strength additive that can be added, more filler has always meant less effective strength additive. This effect is more acute with PCC than GCC because PCC's higher surface area becomes more coated with strength additive than GCC.

In at least one embodiment of the invention at least some of the filler particles are pre-treated with a composition of matter to at least partially prevent the adherence of strength additive to the filler particles. The pre-treatment contemplates entirely coating some or all of one or more filler particles with the composition of matter. In the alternative, the pre-treatment contemplates applying the composition of matter to only a portion of one or more of the filler particles, or completely coating some filler particles and applying the composition of matter to only a portion of some other particles. In at least one embodiment the pre-treatment is performed with at least some of the compositions of matter described in U.S. Pat. No. 5,221,435 and in particular the cationic charge-biasing species described therein. In at least one embodiment the pre-treatment is performed with a diallyl-N,N-disubstituted ammonium halide-acrylamide copolymer described in U.S. Pat. No. 6,592,718.

While pre-treating filler particles is known in the art, prior art methods of pre-treating filler particles are not directed towards affecting the adhesion of the strength additive to the filler particles. In fact, many prior art pre-treatments increase the adhesion of the strength additive to the filler particles. For example, U.S. Pat. No. 7,211,608 describes a method of pre-treating filler particles with hydrophobic polymers. This pre-treatment however does nothing to the adhesion between the strength additive and the filler particles and merely repels water to counterbalance an excess of water absorbed by the strength additive. In contrast, the invention decreases the interactions between the strength additive and the filler particles and results in an unexpectedly huge increase in paper strength. This can best be appreciated by reference to FIG. 1.

FIG. 1 plots tensile strength of a given paper versus the percentage of filler relative to the total solid portion of the paper mat used to produce the given paper. As shown in FIG. 1, the relationship between increasing filler content and decreasing paper strength is a linear relationship. This is because the reduced effectiveness of the strength additive is directly proportional to the increase in strength additive trapped against the filler particles. FIG. 1 also shows that for any given proportion of prior art filler to paper mat, if the filler is pure PCC it will often have a lower strength than if it is partially GCC. FIG. 1 also illustrates the unexpectedly high strength that paper made according to the inventive method possesses. In FIG. 1, a sample of paper mat containing 32% by mass of filler which was 50% PCC and 50% GCC pre-treated with a strength additive-repelling coagulant produced a paper with a greater strength than that produced by a paper mat having only 20% pure GCC filler. This result is doubly unexpected because: a) a PCC containing filler is producing a greater strength paper than pure GCC filler does, and b) the more than 12% increase in allowable filler is extremely large. The high paper strength is a result of the GCC content reducing the interference between cellulose fiber bonds and the pre-treatment allowing the strength additive to achieve or come close to achieving the maximum paper strength.

At least some of the fillers encompassed by this invention are well known and commercially available. They include any inorganic or organic particle or pigment used to increase the opacity or brightness, reduce the porosity, or reduce the cost of the paper or paperboard sheet. The most common fillers are calcium carbonate and clay. However, talc, titanium dioxide, alumina trihydrate, barium sulfate, and magnesium hydroxide are also suitable fillers. Calcium carbonate includes ground calcium carbonate (GCC) in a dry or dispersed slurry form, chalk, precipitated calcium carbonate (PCC) of any morphology, and precipitated calcium carbonate in a dispersed slurry form. The dispersed slurry forms of GCC or PCC are typically produced using polyacrylic acid polymer dispersants or sodium polyphosphate dispersants. Each of these dispersants imparts a significant anionic charge to the calcium carbonate particles. Kaolin clay slurries also are dispersed using polyacrylic acid polymers or sodium polyphosphate.

In at least one embodiment, the treating composition of matter is any one of or combination of the compositions of matter described in U.S. Pat. No. 6,592,718. In particular, any of the AcAm/DADMAC copolymer compositions described in detail therein are suitable as the treating composition of matter. An example of an AcAm/DADMAC copolymer composition is product# Nalco-7527 from Nalco Company of Naperville, Ill. (hereinafter referred to as 7527).

The treating composition of matter can be a coagulant. The coagulants encompassed in this invention are well known and commercially available. They may be inorganic or organic. Representative inorganic coagulants include alum, sodium aluminate, polyaluminum chlorides or PACs (which are also known as aluminum chlorohydroxide, aluminum hydroxide chloride, and polyaluminum hydroxychloride), sulfated polyaluminum chlorides, polyaluminum silica sulfate, ferric sulfate, ferric chloride, and the like and blends thereof.

Some organic coagulants suitable as a treating composition of matter are formed by condensation polymerization. Examples of polymers of this type include epichlorohydrin-dimethylamine (EPI-DMA), and EPI-DMA ammonia crosslinked polymers.

Additional coagulants suitable as a treating composition of matter include polymers of ethylene dichloride and ammonia, or ethylene dichloride and dimethylamine, with or without the addition of ammonia, condensation polymers of multifunctional amines such as diethylenetriamine, tetraethylenepentamine, hexamethylenediamine and the like with ethylenedichloride and polymers made by condensation reactions such as melamine formaldehyde resins.

Additional coagulants suitable as a treating composition of matter include cationically charged vinyl addition polymers such as polymers, copolymers, and terpolymers of (meth)acrylamide, diallyl-N,N-disubstituted ammonium halide, dimethylaminoethyl methacrylate and its quaternary ammonium salts, dimethylaminoethyl acrylate and its quaternary ammonium salts, methacrylamidopropyltrimethylammonium chloride, diallylmethyl(beta-propionamido)ammonium chloride, (beta-methacryloyloxyethyl)trimethyl ammonium methylsulfate, quaternized polyvinyllactam, vinylamine, and acrylamide or methacrylamide that has been reacted to produce the Mannich or quaternary Mannich derivatives. Preferable quaternary ammonium salts may be produced using methyl chloride, dimethyl sulfate, or benzyl chloride. The terpolymers may include anionic monomers such as acrylic acid or 2-acrylamido 2-methylpropane sulfonic acid as long as the overall charge on the polymer is cationic. The molecular weights of these polymers, both vinyl addition and condensation, range from as low as several hundred to as high as several million. Preferably, the molecular weight range should be from about 20,000 to about 1,000,000. In at least one embodiment, the pre-treatment is preformed by a combination of one, some, or all of any of the compositions of matter described as suitable compositions of matter for pre-treating the filler particles.

In at least one embodiment, the strength additive carries the same charge as the composition of matter suitable for treating the filler particles. When the two carry the same charge, the filler additive is less likely to adsorb strength additives on its surface. In at least one embodiment, the strength additive is cationic starch. Strength additives encompassed by the invention include any one of the compositions of matter described in U.S. Pat. No. 4,605,702 and US Patent Application 2005/0161181 A1 and in particular the various glyoxylated Acrylamide/DADMAC copolymer compositions described therein. An example of a glyoxylated Acrylamide/DADMAC copolymer composition is product# Nalco 64170 (made by Nalco Company, Naperville, Ill.)

In at least one embodiment, the fillers used are PCC, GCC, and/or kaolin clay. In at least one embodiment, the fillers used are PCC, GCC, and/or kaolin clay with polyacrylic acid polymer dispersants or their blends. The ratio of strength additive relative to solid paper mat can be 3 kg of additive per ton of paper mat.

The foregoing may be better understood by reference to the following example, which is presented for purposes of illustration and is not intended to limit the scope of the invention.

EXAMPLE 1

1(i) Filler Pre-Treatment

A blend of filler particles was obtained from a paper mill. The blend was a mixture of 50% PCC and 50% GCC. The PCC was un-dispersed Albacar HO (manufactured by Specialty Mineral of Bethlehem, Pa.), and the GCC (also manufactured by Specialty Mineral of Bethlehem, Pa.) was chemically dispersed. For purposes of this application, the definition of the term "un-dispersed" is distributed through a fluid without the aid of a chemical dispersant. For purposes of this application, the definition of the term "chemically dispersed" is distributed through a fluid with the aid of a chemical dispersant.

The filler blend was diluted to 18% solid content with tap water. 200 mL of the diluted filler blend was placed in a 500 mL glass beaker. Stirring was conducted for at least 30 seconds prior to the addition of coagulant. The stirrer was a EUROSTAR Digital overhead mixer with a R1342, 50 mm, four-blade propeller (both from IKA Works, Inc., Wilmington, N.C.). A coagulant solution was slowly added after the initial 30 seconds of mixing under stirring with 800 rpm. The coagulant solution used was 7527. The dose of coagulant was 1 kg/ton based on dry filler weight. Stirring continued at 800 rpm until all the coagulant was added. Then the stirring speed increased to 1500 rpm for one minute.

1(ii) Use of Filler

A thick stock of cellulose fibers was obtained from a paper mill. The stock was cooled and then diluted with clarified white water to a consistency of approximately 0.7%. The cellulose fibers were 60% hardwood bleached kraft pulp (HBKP), 20% softwood bleached kraft pulp (SBKP), and 20% bleached chemi-thermo mechanical pulp (BCTMP). Samples of various filler compositions indicated in FIG. 1 were added. Strength additive 64170 was also added. The tensile strength of paper made with each sample was then measured and plotted in FIG. 1.

Strength analysis of the samples revealed the following: Replacement of pure PCC with 50% PCC and 50% GCC consistently allows for an approximately 3% increase in filler content without any loss of paper strength. However, the combination of a 50% PCC and 50% GCC filler with pretreatment of the GCC particles with the strength additive 64170 and repelling coagulant 7527 resulted in an allowance of an astounding 12% increase in filler content with no loss in paper strength. As a result, it is clear that the steps of the inventive method allow for more filler to be used in papermaking, more PCC to be used in papermaking, while improving the optical properties of the resulting paper.

EXAMPLE 2

Figure 2:
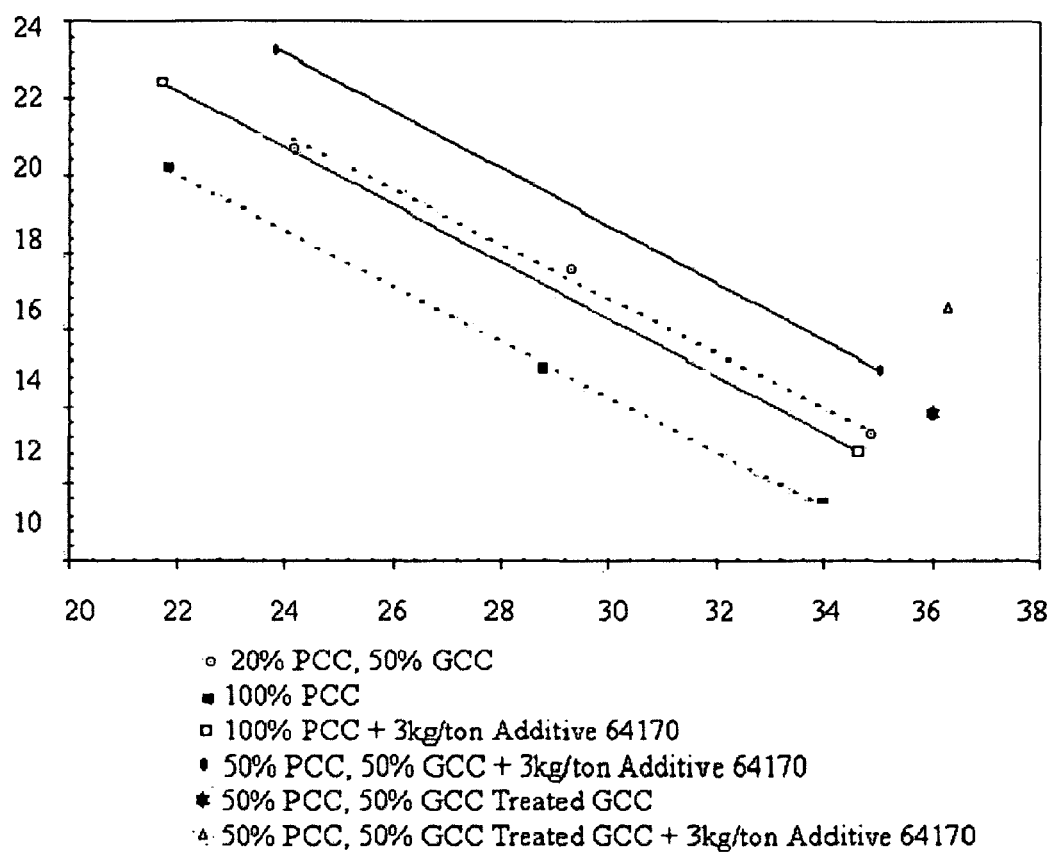
FIG. 2 is a second graph showing the improved strength of paper made according to the invention.

The cellulose mixture and filler were provided as in Example 1. The filler was treated as in Example 1. 3 kg/ton strength additive 64170 was added to three samples, one containing 100% PCC, one containing 50% PCC-50% GCC, and one containing 50% PCC-50% GCC with the GCC pre-treated with 7527. The resulting paper samples were analyzed and results were shown in FIG. 2, which plots tensile strength of a given paper versus the percentage of filler relative to the total solid portion of the paper mat used to produce the given paper.

When 3 kg/ton additive 64170 was added with 100% PCC, only 3% filler content could be increased without strength loss. At around 34% filler content, strength improved 12%. When 100% PCC was switched to 50% PCC-50% GCC, strength increased and it could allow a 3.5% filler content increase without losing sheet strength. When 3 kg/ton additive 64170 was added, about another 2.5% filler content could be increased without sacrificing sheet strength. At 35% filler content, sheet strength improved 14% with the addition of 3 kg/ton 64170. Compared with 50% PCC-50% GCC, 7527 pre-treated 50% PCC-50% GCC could increase 2% filler without losing strength. When add 3 kg/ton N-64170 to the furnish with pre-treated 50% PCC-50% GCC, the filler content could be increased by 4% without losing sheet strength compared with pre-treated 50% PCC-50% GCC only. At 36% filler content, addition of 3 kg/ton N-64170 increased the strength 19%. This experiment demonstrated that with the same amount of strength additive 64170, the efficiency of improving sheet strength was increased significantly by pre-treating the filler.

EXAMPLE 3

A machine trial was run in which a papermaking machine made 108 gsm coated base paper with machine speed of 1360 m/min. A composition was provided whose cellulose fibers were 40% Bleached Chemi-Thermo-Mechanical Pulp (BCTMP), 40% HBKP 40%, SBKP 20%. The furnish also contained a filler blend which was 70% PCC and 30% GCC. During the trial, all the wet end additives including retention aids, sizing agents, and cationic starches were kept constant. The resulting paper strength was measured using a Scott Bond tester.

Figure 3:
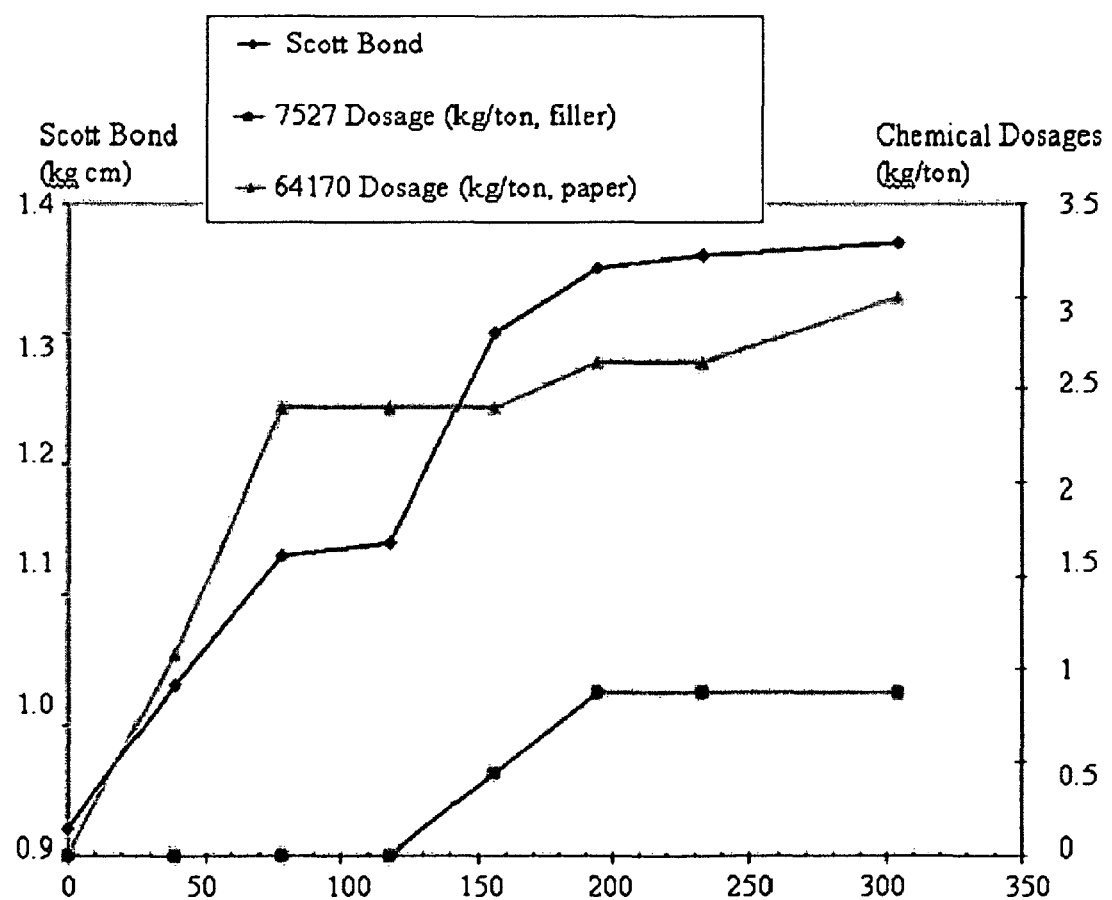
FIG. 3 is a graph showing the Scott Bond strengths of paper blends made according to the invention.

FIG. 3 shows the resulting Scott Bond strengths of paper blends that included 8 blends that have various amounts of 7527 and 64170. When no 7527 and no 64170 were added, the strength was 0.92 kg cm. When 2.5 kg/ton of 64170 was added, the strength increased to 1.14 kg cm, a 24% strength improvement. Upon the further addition of 0.5 kg/ton of 7527 however the strength increased from 1.14 kg cm to 1.30 kg cm a further 14% improvement. This trial demonstrated that with addition of a small amount of coagulant, the efficiency of 64170 is greatly improved.

A person of ordinary skill in the art will recognize that all of the previously described methods are also applicable to paper mat comprising other non-cellulose based fibrous materials, paper mats comprising a mixture of cellulose based and non-cellulose based fibrous materials, and/or synthetic fibrous based materials.

Changes can be made in the composition, operation, and arrangement of the method of the invention described herein without departing from the concept and scope of the invention as defined in the claims. While this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments described herein. All patents, patent applications, and other cited materials mentioned anywhere in this application or in any cited patent, cited patent application, or other cited material are hereby incorporated by reference in their entirety.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of papermaking having an increased filler content, the method comprising the steps of:
   providing a blend of filler particles, at least one strength additive, and cellulose fiber stock,
   pre-treating the filler particles with a composition of matter,
   combining the filler particles with the cellulose fiber stock after the filler particles have been pre-treated,
   treating the combination with at least one strength additive, and
   forming a paper mat from the combination,
   wherein at least 10% of the filler particles are precipitated calcium carbonate and at least 10% of the filler particles are ground calcium carbonate,
   the cellulose fiber stock comprises a plurality of cellulose fibers and water, and
   the composition of matter enhances the performance of the strength additive in the paper mat.

2. The method of claim 1 in which the paper mat is formed by removing some of the water from the combination.

3. The method of claim 1 in which at least some of the calcium carbonate is in one form selected from the list consisting of: undispersed calcium carbonate, dispersed slurry calcium carbonate, chalk, and any combination thereof.

4. The method of claim 1 in which at least a portion of the calcium carbonate is in a dispersed slurry calcium carbonate form, the dispersed slurry calcium carbonate further comprising at least one item selected from: polyacrylic acid polymer dispersants, sodium polyphosphate dispersants, Kaolin clay slurry, and any combination thereof.

5. The method of claim 1 in which the blend of filler particles is 50% ground calcium carbonate and 50% precipitated calcium carbonate.

6. The method of claim 1 in which the composition of matter is a coagulant.

7. The method of claim 1 in which the composition of matter is a coagulant selected from the list consisting of: inorganic coagulants, organic coagulants, condensation polymerization coagulants, and any combination thereof.

8. The method of claim 1 in which the composition of matter is a coagulant having a molecular weight range of between 200 and 1,000,000.

9. The method of claim 1 in which the composition of matter is a coagulant selected from the list consisting of: alum, sodium aluminate, polyaluminum chlorides, aluminum chlorohydroxide, aluminum hydroxide chloride, polyaluminum hydroxychloride, sulfated polyaluminum chlorides, polyaluminum silica sulfate, ferric sulfate, ferric chloride, epichlorohydrin-dimethylamine (EN-DMA), EPI-DMA ammonia crosslinked polymers, polymers of ethylene dichloride and ammonia, polymers of ethylene dichloride, polymers of dimethylamine, condensation polymers of multifunctional diethylenetriamine, condensation polymers of multifunctional tetraethylenepentamine, condensation polymers of multifunctional hexamethylenediamine condensation polymers of multifunctional ethylenedichloride, melamine polymers, formaldehyde resin polymers, cationically charged vinyl addition polymers, and any combination thereof.

10. The method of claim 1 in which the composition of matter is an AcAm/DADMAC copolymer.

11. The method of claim 1 in which the strength additive is glyoxylated Acrylamide/DADMAC copolymer.

12. The method of claim 1 in which the ratio of strength additive relative to the solid portion of the paper mat is 0.3 to 5 kg of strength additive per ton of paper mat.

13. The method of claim 1 in which at least some of the GCC particles are treated with the composition of matter.

14. The method of claim 1 in which none of the PCC particles are treated with the composition of matter.

15. The method of claim 1 in which the strength additive is a cationic starch.

16. The method of claim 1 in which the paper mat has a solid portion and the filler particles in the paper mat comprise more than 50% of the combined mass of the solid portion of the paper mat.

17. The method of claim 1 in which the strength additive and the composition of matter carry the same charge.

18. The method of claim 1 in which the blend of filler particles further comprises one item selected from the list consisting of: organic pigment, inorganic pigment, clay, talc, titanium dioxide, alumina trihydrate, barium sulfate, magnesium hydroxide, and any combination thereof.

* * * * *